United States Patent [19]

Takagi et al.

[11] Patent Number: 4,782,423

[45] Date of Patent: Nov. 1, 1988

[54] LIGHTNING ARRESTER

[75] Inventors: Kunihiko Takagi, Tama; Masaki Ikuta, Tachikawa; Takao Takeshina, Kanagawa, all of Japan

[73] Assignee: Kabushiki Kaisha Toshiba, Kawasaki, Japan

[21] Appl. No.: 90,242

[22] Filed: Aug. 25, 1987

[30] Foreign Application Priority Data

Sep. 9, 1986 [JP] Japan ............................... 61-212328

[51] Int. Cl.[4] ............................................... H02H 1/04

[52] U.S. Cl. .................................... 361/127; 361/118; 361/132

[58] Field of Search ............... 361/117, 118, 120, 121, 361/126, 127, 131, 132

[56] References Cited

U.S. PATENT DOCUMENTS 4,679,113 7/1987 Book et al. ..................... 361/127 X

FOREIGN PATENT DOCUMENTS 58-11726 3/1983 Japan .
59-40480 3/1984 Japan .
59-138089 8/1984 Japan .

*Primary Examiner*—A. D. Pellinen
*Assistant Examiner*—Derek S. Jennings
*Attorney, Agent, or Firm*—Foley & Lardner Schwartz, Jeffery Schwaab, Mack Blumenthal & Evans

[57] ABSTRACT

A lightning arrester for discharging electricity from an electrode in a container of the ground voltage level filled with electric insulation fluid when an excessive voltage is imposed on the electrode. The arrester has characteristic elements for selectively discharging electricity and an insulation tube for enclosing the characteristic elements. The insulation tube is so arranged as that part of the characteristic elements are inserted in the container and some of them project out. The characteristic elements are connected to the electrode in the container, and selectively connected and disconnected to the ground.

7 Claims, 5 Drawing Sheets

LIGHTNING ARRESTER

BACKGROUND OF THE INVENTION

1. Field of the Invention

This invention relates to a lightning arrester for discharging electricity when an excessive voltage is imposed on an electrode in a container filled with insulation fluid.

2. Description of the Prior Art

"Gapless type" lightning arresters utilizing characteristic elements of zinc oxide are generally used for cubicle gas-insulated switching devices, as shown in Japanese Patent Publication (Kokoku) No. 58-11726 and Japanese Patent Disclosure (Kokai) No. 59-138089. An end of a series of characteristic elements is connected to an electrode in a gas filled cubicle or a container, and the other end is connected to ground voltage level. When the electrode voltage is lower than a threshold value, the electric resistance in the characteristic elements is infinity. If the electrode voltage rises higher than the threshold value due to lightning, the electric resistance decreases abruptly, and electricity discharges in the characteristic elements, protecting other devices connected to the electrode.

After on-site installation of a cubicle gasinsulated switching device has been completed, a withstand-voltage test is carried out in accordance with the technical standards for electrical installations. At this time, if the withstandvoltage is inadvertently applied to the arrester during the test, there is a possibility of the life of the characteristic elements being shortened or of insulation breakdown occurring. Therefore, the arrester should be isolated from the main circuit before the withstand-voltage test is carried out, and should be connected again after the test is completed.

The arresters disclosed in the above-mentioned references have the following problems. First, since the characteristic elements and an insulation tube containing the characteristic elements are all enclosed in the cubicle, the cubicle has to be large in height. Secondly, since there are sliding parts in the cubicle for connection and disconnection of the arrester to the main circuit, complicated structure is required for sealing the insulation gas.

Thirdly, it is difficult to check the performance of the arrester itself or to replace the arrester, because the insulation gas would leak out if the arrester is taken off the cubicle.

Japanese Patent Disclosure (Kokai) No. 59-40480 discloses an arrester with characteristic elements arranged and connected in a triangular position. The cubicle can be designed shorter using this arrester. However, the total volume of the arrester is the same. The construction is more complicated, and the above noted problems are still not solved.

SUMMARY OF THE INVENTION

An object of the invention is to provide an arrester which utilizes a small container for enclosing an electrode and insulation gas.

Another object of the invention is to provide an arrester which is easy to be replaced, and which is easy to be tested.

According to the invention, there is provided an arrester for discharging electricity from an electrode in a container filled with electric insulation fluid when an excessive voltage is imposed on the electrode, the arrester comprising: a characteristic member for discharging electricity only when a voltage higher than a predetermined value is imposed; an insulation tube made of electrically insulating material for enclosing the characteristic member, the tube so arranged that a first part of the characteristic member is inserted in the container and a second part of the characteristic member projects outside of the container; means for electrically connecting the first part of the characteristic member contained within the container to the electrode; and means positioned entirely outside of the container for selectively electrically connecting and disconnecting the second part of the characteristic member located outside of the container with a ground voltage level.

Further objects, features and advantages of the present invention will become apparent from the detailed description of the preferred embodiments that follow, when considered with the attached drawings.

BRIEF DESCRIPTION OF THE DRAWINGS

The accompanying drawings, which are incorporated in and constitute a part of this specification, illustrate preferred embodiments of the invention and, together with the description, serve to explain the principles of the invention. In the drawings:

FIG. 1 is a view when the ground conductor is connected, and FIG. 2 is a view when it is disconnected;

FIG. 3 show ratios when the ground conductor is connected, and FIG. 4 shows ratios when it is disconnected;

FIG. 5 is a view when the lid is closed and the ground connector is connected to the ground, and FIG. 6 is a view when they are removed;

FIG. 7 shows ratios when the ground connector is connected, and FIG. 8 shows ratios when it is disconnected;

DETAILED DESCRIPTION OF THE PREFERRED EMBODIMENT

Figure 1:
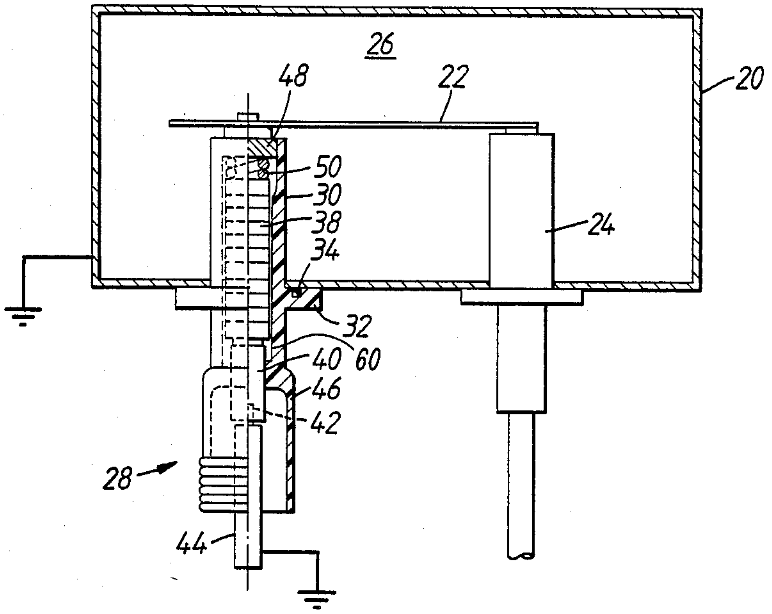
FIGS. 1 and 2 are partially cross-sectional views of the lightning arrester of the first embodiment of this invention mounted on a container.
Figure 2:
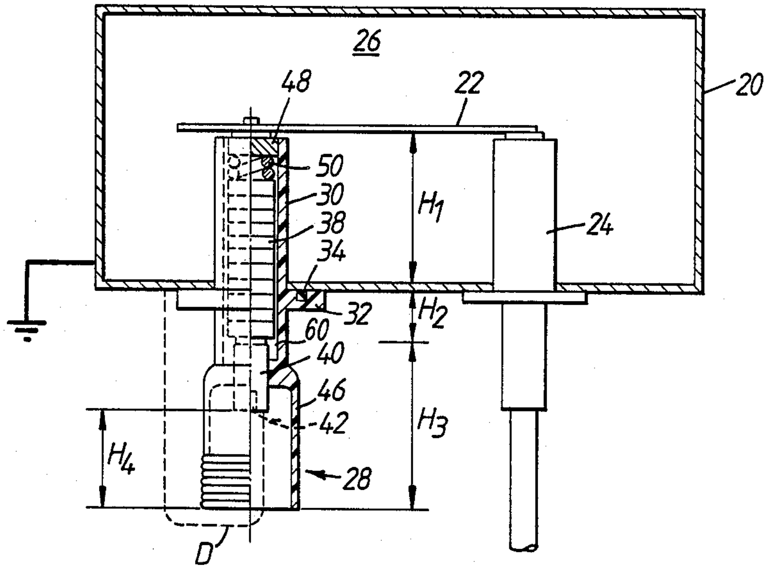

A first embodiment of the invention of the arrester is shown in FIGS. 1 and 2. A container 20 is made of electrically conductive metal, and is maintained at ground voltage level. The container 20 encloses an electrode 22 which is connected to a cable head 24. The cable head 24 penetrates the container 20, and comprises an electrical wire and a surrounding insulator for insulating the wire from the container 20. The container 20 is filled with insulation gas 26 such as $SF_6$.

An arrester 28 is mounted on the container 20. The arrester 20 has a cylindrical insulation tube 30 made of electrically insulating material.

The insulation tube 30 has a flange 32 on its side. The arrester 28 is inserted about halfway in the container 20, and, fixed to the container 20 with the flange 32. The flange 32 has a sealing ring 34 which seals the insulation gas 26 in the container 20.

A plurality of characteristic elements 38 are stacked inside the insulation tube 30. As seen from FIGS. 1 and 2, part of the characteristic elements 38 are arranged in the container 20, and part are arranged outside of the container 20.

The characteristic elements 38 are made of material such as zinc oxide, which is electrically insulating in normal conditions, but which is conductive when a voltage higher than a threshold value is applied.

A ground electrode 40 is integrally molded at the outside end of the insulation tube 30. The ground electrode 40 is in contact with the characteristic elements 38, and is exposed to the atmosphere.

The ground electrode 40 has a ground conductor coupling unit 42 which is removably connected to a ground conductor 44 which is fixed at ground potential.

The insulation tube 30 is provided with an insulation skirt 46 which surrounds and extends beyond the side of the ground electrode 40 covering part of the ground conductor 44.

An electrically conductive cap 48 is fixed at the inner end of the insulation tube 30. The cap 48 is in contact with the electrode 22 in the insulation gas 26. An electrically conductive spring 50 is inserted between the cap 48 and the characteristic elements 38. The spring 50 electrically connects the cap 48 and the characteristic elements 38, and biases the characteristic elements 38 against the ground electrode 40 thus insuring electrical contact between the characteristic elements 38 and the ground electrode 40.

The insulation tube 30 is filled with gas 80 such as nitrogen for insulation and for corrosion prevention.

When a voltage-withstanding test is done, the ground conductor 44 is removed as shown in FIG. 2.

According to this embodiment, about half of the insulation tube 30 projects outside the container 20. Consequently, some of the characteristic elements 38 in the insulation tube 30 are positioned outside the container 20. The height of the container 20 is, therefore, greatly reduced in comparison with devices in which all of the insulation tube 30 is positioned in the container 20.

Figure 3:
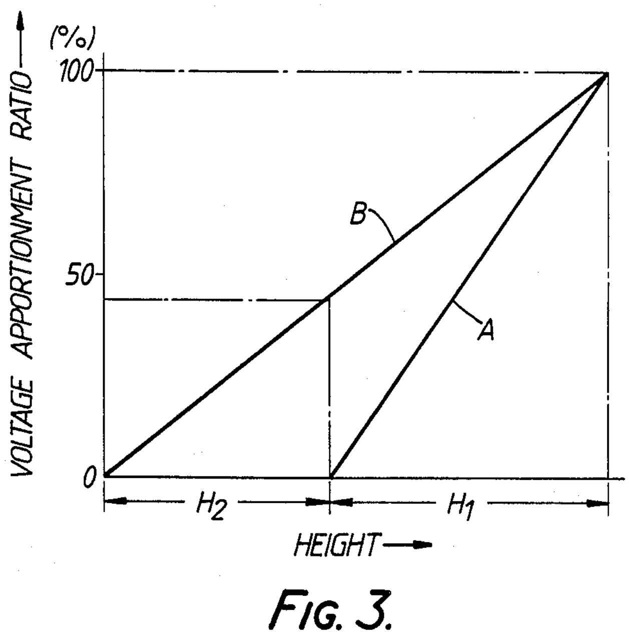
FIGS. 3 and 4 are characteristic plots showing voltage apportionment ratios of the first embodiment.
Figure 4:
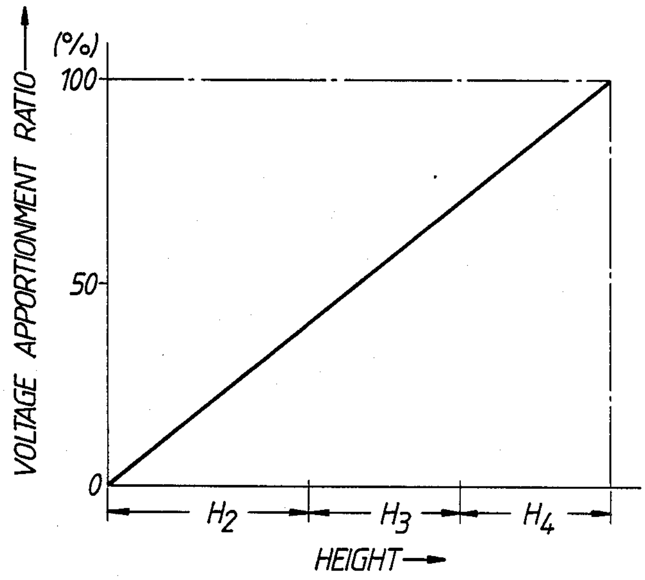

The voltage apportionment ratio characteristic is shown in FIGS. 3 and 4. Height or distance is taken along the horizontal axis and the voltage apportionment ratio is taken along the vertical axis.

As shown in FIG. 2, $H_1$ denotes the distance of the electrode 22 from the wall of the container 20, $H_2$, the distance of the outer end of the characteristic elements 38 from the wall of the container 20, $H_3$, the distance between the outer end of the characteristic elements 38 and the tip of the skirt 46, and $H_4$, the length of the skirt 46 which extends beyond the end of ground electrode 40.

FIG. 3 shows voltage apportionment ratios when the arrester 28 is in operation or the ground conductor 44 is connected as shown in FIG. 1.

The voltage between the electrode 22 and the container 20 is apportioned linearly in the distance of $H_1$ in the insulation gas 26 as shown by line A in FIG. 3.

The same voltage is apportioned in the distance of $H_1$ and $H_2$ linearly in the characteristic elements 38 as shown by line B in FIG. 3.

The heights of the cap 48 and the spring 50 and the thickness of the wall of the container 20 are neglected here.

The line B is linear, because, at moderate voltage (below 36 kV), the number of characteristic elements 38 in series is small, so the electrostatic self-capacitance per characteristic element 38 is much larger than the stray electrostatic capacitance of characteristic elements 38 with respect to ground. Therefore, the voltage apportionment ratio of the characteristic elements 38 in the axial direction is determined by the self-capacitance of the characteristic elements 38. Consequently, even though some of the characteristic elements 38 project outside the container 20, this has no effect on the life span of the characteristic elements 38.

FIG. 4 shows the voltage apportionment in air when the ground conductor is isolated as shown in FIG. 2. In this case, the ground electrode 40 attains the same voltage as the electrode 22. Consequently, the voltage of the electrode 22 is apportioned linearly by $H_2+H_3+H_4$ in air. The length $H_2+H_3+H_4$ may be understood in considering a discharge path from the end of ground electrode 40 (having the same voltage as electrode 22) around the skirt 46 and to the container 20 as shown by dotted line D. In this case, the insulation skirt 46 provides a kind of barrier effect, so the required withstand-voltage characteristic is obtained even in air.

In utilizing the first embodiment of the arrester described above, the following benefits are obtained.

(1) Since the height of the container 20 can be effectively reduced, a balance can be kept with the dimensions of the other equipment, for instance the cable head 24.

(2) In tests of voltage-withstanding ability, it is sufficient just to remove the ground conductor 44 which may be done from outside the container 20. For this purpose, a disconnecting switch, such as shown in the above referenced Japanese Patent Publication (Kokoku) No. 58-11726 and Japanese Patent Disclosure (Kokai) No. 59-138089, for isolating the operating rod or movable electrode is completely unnecessary. Consequently, the disconnection operation is easy, so the construction is greatly simplified, and reliability with respect to insulation gas leakage is greatly improved.

A second embodiment is described below in reference to FIGS. 5 and 6. The parts in common with the first embodiment are denoted by the same numerals and most of their descriptions are omitted.

An arrester 100 is mounted on the container 20 which is filled with insulation gas 26. The arrester 100 has a cylindrical outer insulation tube 102 made of electrically insulating material. The outer insulation tube 102 has a flange 104 on its side, and the arrester 100 is fixed about halfway in the container 20 with the flange 104. The flange 104 has a sealing ring 34 which seals the insulation gas 26.

An inner insulation tube 106 is accommodated in the outer insulation tube 102, and the characteristic elements 38 are stacked inside the inner insulation tube 106. Part of the characteristic elements 38 are arranged in the container 20, and part are arranged outside of the container 20.

The outer end of the outer insulation tube 102 has a removable lid 108 made of insulation material. The lid 108 is provided with a ground electrode 110 penetrating the lid 108. The ground electrode 110 is connected to ground.

An electrode 112 is provided at the inner end of the outer insulation tube 102. The electrode 112 is electrically connected to the cable head 24 with an electric conductor 114 in the container 20. The inner insulation tube 106 has upper contracter 116*a* at its upper end and lower contacter 116*b* at its lower end which are in contact with the ends of the series of the characteristic elements 38.

An electric conductive spring 118 is inserted between the lid 108 and the inner insulation tube 106, which secures good contacts, between the electrode 112 and the upper contactor 116*a*, and between the ground electrode 110 and the lower contactor 116*b*.

Figure 6:
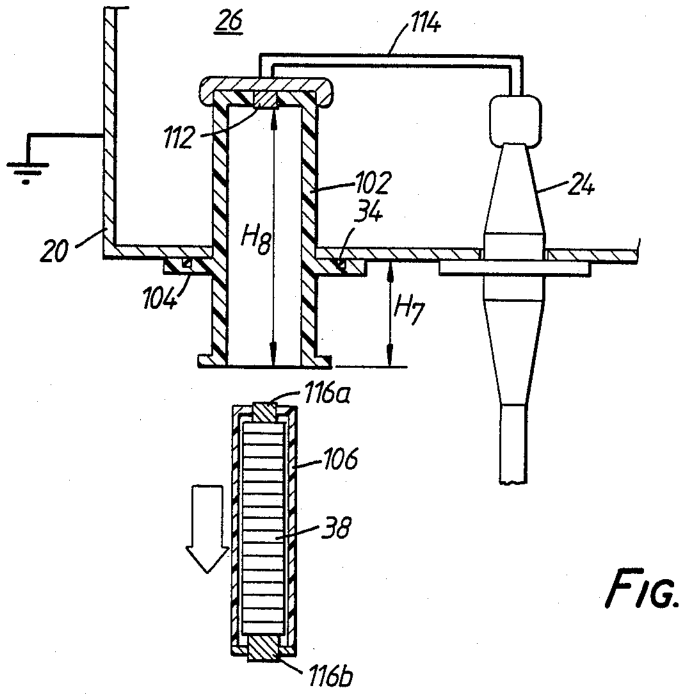

When a voltage-withstanding test is done, the lid 108 with the ground electrode 110, the spring 118, and the characteristic elements 38 contained in the inner insulation tube 106 are taken out, as shown in FIG. 6.

Figure 7:
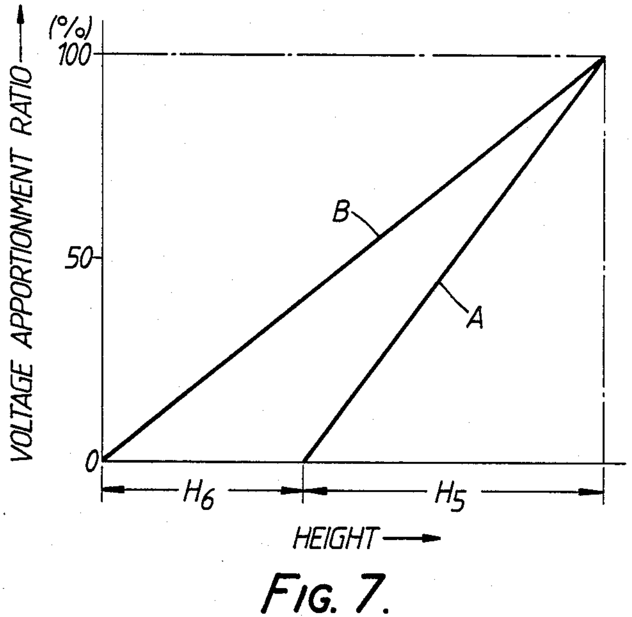
FIGS. 7 and 8 are characteristic plots showing voltage apportionment ratios of the second embodiment.
Figure 8:
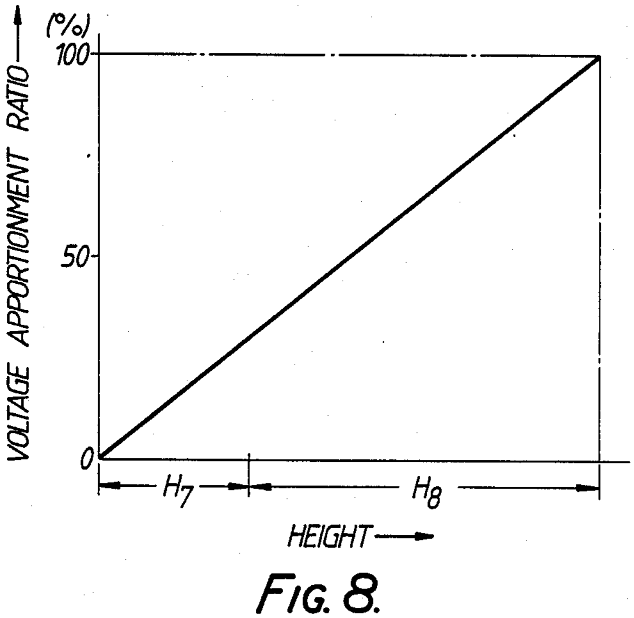

The voltage apportionment ratio characteristic of this embodiment is shown in FIGS. 7 and 8 which are similar to FIGS. 3 and 4. As shown in FIG. 5, $H_5$ denotes the distance of the electrode 112 from the wall of the container 20, and $H_6$ denotes the distance of the lid 108 from the wall of the container 20. As shown in FIG. 6, $H_7$ denotes the distance of the outer end of the outer insulation tube 102 from the wall of the container 20, and $H_8$ denotes the distance of the electrode 112 from the outer end of the outer insulation tube 102.

Figure 5:
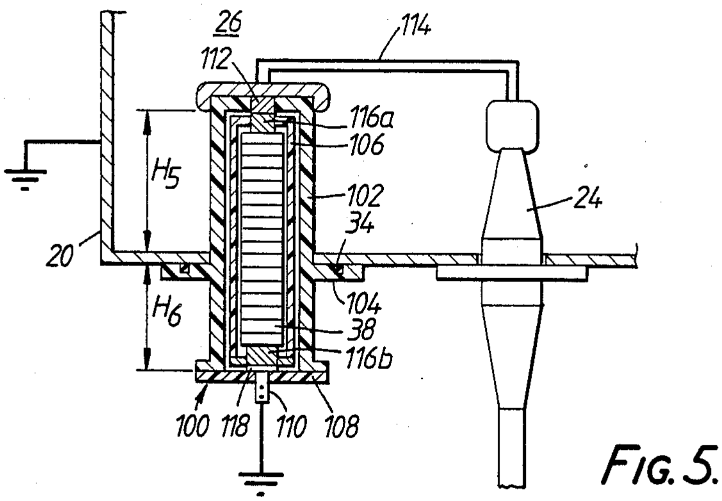
FIGS. 5 and 6 are partially cross-sectional views of the lightning arrester of the second embodiment of this invention mounted on a container.

FIG. 7 shows voltage apportionment ratio when the arrester 100 is in operation as shown in FIG. 5. The voltage between the electrode 112 and the container 20 is apportioned linearly in the distance of $H_5$ in the insulation gas 26 as shown by line A in FIG. 7. The same voltage is apportioned in the distance of $H_5+H_6$ linearly in the characteristic elements 38 as shown by line B in FIG. 7. The height of the spring 118 and the thickness of the wall of the container 20 are neglected here.

FIG. 8 shows the voltage apportionment in air when the ground electrode 110 and the characteristic elements 38 are removed as shown in FIG. 6. In this case, the electrode 112 is exposed to atmosphere, and the voltage of the electrode 112 is apportioned linearly by $H_7+H_8$ in the air.

The benefits (1) and (2) of the first embodiment described above are obtained by the second embodiment also. Furthermore, checking the characteristics of the characteristic elements 38 or replacement of them can be easily achieved by opening the lid 108 and taking out the characteristic elements 38 in the inner insulation tube 106, without any concern about the escape of the insulation gas 26 in the container 20.

Figure 9:
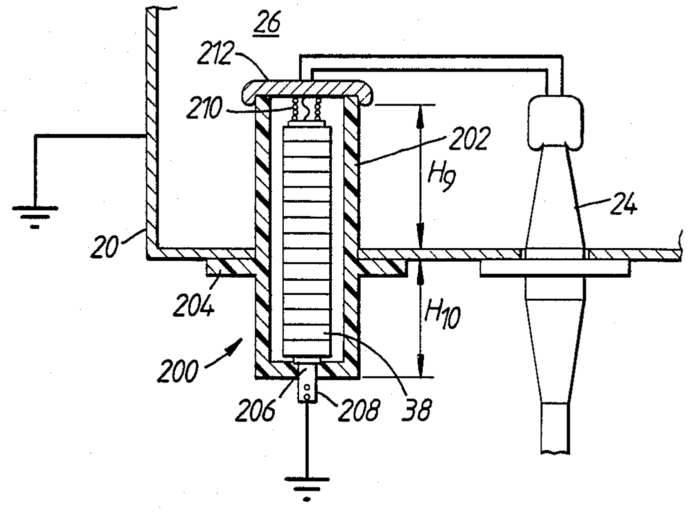
FIG. 9 is a partially cross-sectional view of the lightning arrester of the third embodiment of this invention mounted on a container.

A third embodiment is described below referring to FIG. 9. The parts in common with the first and second embodiments are denoted by the same numerals, and most of their descriptions are omitted.

An arrester 200 is mounted on the container 20 which is filled with insulation tube 202 made of electrically insulating material. The insulation tube 202 has a flange 204 on its side, and the arrester 200 is inserted about halfway in the container 20 and fixed to the container 20 with the flange 204.

The characteristic elements 38 are stacked inside the insulation tube 202. Part of the characteristic elements 38 are arranged in the container 20, and part are arranged outside of the container 20.

The outside end of the insulation tube 202 is closed and a ground electrode 206 is mounted there. The ground electrode 206 is in contact with the characteristic elements 38, and it is provided with a ground terminal 208 which is selectively connected to ground.

The inner end of the stacked characteristic elements 38 is connected with a spring 210 to an electrode 212 in the container 20.

The electrode 210 is connected to the cable head 24 in the container 20.

Figure 10:
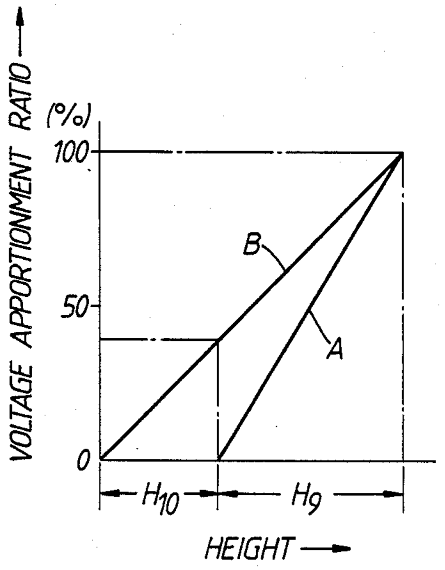
FIG. 10 is a characteristic plot showing voltage apportionment ratios of the third embodiment.

The voltage apportionment ratio characteristic of this embodiment is shown in FIG. 10. Height or distance is taken along the horizontal axis and the voltage apportionment ratio is taken along the vertical axis in this figure. $H_9$ denotes the distance of the electrode 212 from the wall of the container 20, and $H_{10}$ denotes the distance of the ground electrode 206 from the wall of the container 20, as shown in FIG. 9.

The voltage apportionment characteristics in the insulation gas 26 and in the characteristic elements 38, shown as lines A and B in FIG. 10, are similar to those of the first and second embodiments.

Figure 11:
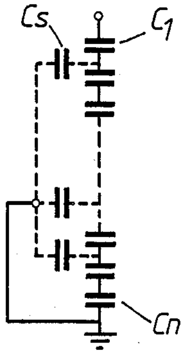
FIG. 11 is an equivalent circuit diagram of the arrester when the ground electrode is connected to the ground.

The voltage apportionment characteristics in the characteristic elements 38 shown as line B is linear despite of the fact that some of the characteristic elements 38 project outside the container 20. This can be explained with reference to an equivalent circuit diagram shown in FIG. 11. The electrostatic capacitances $C_1, \ldots, C_n$ of the characteristic elements 38 themselves are much larger than the stray electrostatic capacitance $C_s$ which exists between each characteristic element and the ground. Therefore, the voltage apportionment ratio is determined by the electrostatic capacitances $C_1, \ldots, C_n$ of the characteristic elements themselves. This is as explained with reference to the first and second embodiments.

The benefits (1) and (2) of the first embodiment described above are obtained by the third embodiment also.

The foregoing description has been set forth merely to illustrate preferred embodiments of the invention and is not intended to be limiting. Since modification of the desired embodiments incorporating the spirit and substance of the invention may occur to persons skilled in the art, the scope of the invention should be limited solely with respect to the appended claims and equivalents.

What is claimed is:

1. An arrester for discharging electricity from an electrode when an excessive voltage is imposed on the electrode, the electrode fixed in a container of ground voltage level put in atmosphere, and the container being filled with electric insulation fluid, the arrester comprising:

a characteristic member having first and second ends, the characteristic member discharging electricity only when a voltage higher then a predetermined value is imposed between the first and second ends;

means for electrically connecting the first end of the characteristic member to the electrode;

means positioned entirely outside of the container for selectively electrically connecting and disconnecting the second end of the characteristic member with a ground voltage located outside of the container; and an insulation tube made of electrically insulating material for enclosing the characteristic member and filled with a gas, the tube so arranged that the first end of the characteristic member is inserted in the container and the second end of the characteristic member projects in the atmosphere, the insulation fluid is sealed in the container outside the tube, and an insulation distance in the insulation fluid from the electrode to the container and an insulation distance in the gas in the insulation tube from the electrode to the second end of the characteristic member are substantially equal in voltage durability.

2. An arrester according to claim 1, wherein the insulation tube has an insulation skirt of electrically insulating material enclosing at least part of the means for selectively electrically connecting and disconnecting.

3. An arrester according to claim 1, wherein the insulation tube comprises an inner insulation tube of insulating material enclosing the characteristic member, and an outer insulation tube of insulating material enclosing the inner insulation tube so as that the inner insulation tube can be removed from the outer insulation tube.

4. An arrester according to claim 1, wherein said insulation tube is fixedly secured to said container for sealing said insulation fluid within said container.

5. An arrester as recited in claim 1, wherein said gas comprises nitrogen.

6. An arrester as recited in claim 5, wherein said fluid comprises $SF_6$.

7. An arrester as recited in claim 1, wherein said fluid comprises $SF_6$.

* * * * *